(12) United States Patent
Ueda et al.

(10) Patent No.: US 7,995,326 B2
(45) Date of Patent: Aug. 9, 2011

(54) CHIP-TYPE ELECTRONIC COMPONENT

(75) Inventors: Kaname Ueda, Tokyo (JP); Dai Matsuoka, Tokyo (JP); Naoki Chida, Tokyo (JP); Izuru Soma, Tokyo (JP); Hisayoshi Saito, Tokyo (JP); Katsunari Moriai, Tokyo (JP)

(73) Assignee: TDK Corporation, Tokyo (JP)

( * ) Notice: Subject to any disclaimer, the term of this patent is extended or adjusted under 35 U.S.C. 154(b) by 257 days.

(21) Appl. No.: 12/470,168

(22) Filed: May 21, 2009

(65) Prior Publication Data

US 2009/0296312 A1 Dec. 3, 2009

(30) Foreign Application Priority Data

Jun. 3, 2008 (JP) .................................. 2008-145966

(51) Int. Cl.
*H01G 4/228* (2006.01)
(52) U.S. Cl. .................. 361/306.3; 361/306.1; 361/311; 361/313; 361/321.1; 361/321.2
(58) Field of Classification Search .............. 361/306.3, 361/306.1, 301.2, 301.4, 311–313, 321.1, 361/321.2, 308.1, 308.3; 333/182, 184
See application file for complete search history.

(56) References Cited

U.S. PATENT DOCUMENTS

| 6,108,191 | A  | * | 8/2000  | Bruchhaus et al. ........ 361/306.3 |
| 6,381,120 | B2 | * | 4/2002  | Sakai ........................ 361/321.2 |
| 6,477,030 | B2 | * | 11/2002 | Hidaka et al. .............. 361/301.3 |
| 6,606,237 | B1 | * | 8/2003  | Naito et al. ................ 361/306.3 |
| 7,075,775 | B2 | * | 7/2006  | Yamazaki .................. 361/306.3 |
| 7,177,138 | B2 | * | 2/2007  | Yoshii et al. .............. 361/306.3 |
| 7,362,559 | B2 | * | 4/2008  | Tominaga .................. 361/306.1 |

FOREIGN PATENT DOCUMENTS

JP        A 2-256216     10/1990

* cited by examiner

*Primary Examiner* — Nguyen T Ha
(74) *Attorney, Agent, or Firm* — Oliff & Berridge, PLC

(57) ABSTRACT

A chip-type electronic component has: a ceramic element body; a plurality of first and second internal electrodes arranged in the ceramic element body so as to be opposed at least in part to each other; a first external connection conductor to which the plurality of first internal electrodes are connected; a second external connection conductor to which the plurality of second internal electrodes are connected; first and second terminal electrodes; a first internal connection conductor arranged in the ceramic element body and connecting the first external connection conductor and the first terminal electrode; and a second internal connection conductor arranged in the ceramic element body and connecting the second external connection conductor and the second terminal electrode. The number of the first internal connection conductor is set to be smaller than the number of the first internal electrodes and the number of the second internal connection conductor is set to be smaller than the number of the second internal electrodes.

15 Claims, 12 Drawing Sheets

CHIP-TYPE ELECTRONIC COMPONENT

BACKGROUND OF THE INVENTION

1. Field of the Invention

The present invention relates to a chip-type electronic component.

2. Related Background Art

There is a known chip-type electronic component which has a ceramic element body consisting of a plurality of ceramic layers laminated together, a plurality of first and second internal electrodes arranged alternately in the ceramic element body so as to be opposed at least in part to each other, a first terminal electrode which is arranged on an external surface of the ceramic element body and to which the plurality of first internal electrodes are connected, and a second terminal electrode which is arranged on the external surface of the ceramic element body and to which the plurality of second internal electrodes are connected (e.g., cf. Japanese Patent Application Laid-open No. 02-256216).

SUMMARY OF THE INVENTION

Since in the chip-type electronic component described in Laid-open No. 02-256216 the plurality of first internal electrodes are connected to the first terminal electrode and the plurality of second internal electrodes are connected to the second terminal electrode, the chip-type electronic component has the following problem.

The size (area) of the terminal electrodes is limited because of design restrictions, e.g., the size (area) of mounting electrodes on the external device side such as a substrate or electronic component on which the chip-type electronic component is to be mounted, and a space to adjacent terminal electrodes. The plurality of internal electrodes need to be physically and electrically connected to the corresponding terminal electrodes. For this reason, when viewed in a laminate direction of the plurality of ceramic layers, a range in which the internal electrodes can be arranged in the ceramic element body is limited to a range less than the length of the terminal electrodes in the laminate direction.

The internal electrodes cannot be arranged beyond the foregoing range because electrical connection thereof cannot be established with the terminal electrodes; therefore, the number of internal electrodes to be arranged is also limited. Particularly, in cases where the chip-type electronic component is small in size, the size of the terminal electrodes itself must be small and the arrangement number of internal electrodes (the number of laminated layers thereof) is further limited. For example, in a case where there is a need for setting of a large capacitance, the arrangement number of internal electrodes needs to be increased, but the arrangement number is limited. For this reason, it is hard for the chip-type electronic component described in Laid-open No. 02-256216 to meet the need for implementation of large capacitance.

Incidentally, the chip-type electronic component of this kind can suffer so-called projection of the internal electrodes, which is a phenomenon in which the internal electrodes grow so as to project from the surface of the ceramic element body, because of a difference between a rate at which metal forming the internal electrodes diffuses into metal forming the terminal electrodes and a rate at which the metal forming the terminal electrodes diffuses into the metal forming the internal electrodes. In this case, adhesion deteriorates between the ceramic element body and the terminal electrodes, which could result in degradation of joint strength. If the chip-type electronic component is subjected to an external impact in a mounted state on an external device because of a drop or the like under the condition that the joint strength is degraded between the ceramic element body and the terminal electrodes, the terminal electrodes can be peeled off the ceramic element body, so as to cause a conduction failure. For this reason, the terminal electrodes are also required to be improved in joint strength to the ceramic element body.

An object of the present invention is to provide a chip-type electronic component achieving an improvement in joint strength between the terminal electrodes and the ceramic element body, while enhancing design freedom for the arrangement number of internal electrodes.

The present invention provides a chip-type electronic component comprising: a ceramic element body; a plurality of first and second internal electrodes arranged in the ceramic element body so as to be opposed at least in part to each other; a first external connection conductor which is arranged on an external surface of the ceramic element body and to which the plurality of first internal electrodes are connected; a second external connection conductor which is arranged on the external surface of the ceramic element body and to which the plurality of second internal electrodes are connected; first and second terminal electrodes arranged on the external surface of the ceramic element body; a first internal connection conductor arranged in the ceramic element body and connecting the first external connection conductor and the first terminal electrode; and a second internal connection conductor arranged in the ceramic element body and connecting the second external connection conductor and the second terminal electrode, wherein the number of the first internal connection conductor is set to be smaller than the number of the first internal electrodes, and wherein the number of the second internal connection conductor is set to be smaller than the number of the second internal electrodes.

In the present invention, the first internal electrodes are not directly connected to the first terminal electrode, but are electrically connected through the first external connection conductor and the first internal connection conductor to the first terminal electrode. The second internal electrodes are not directly connected to the second terminal electrode, but are electrically connected through the second external connection conductor and the second internal connection conductor to the second terminal electrode. Since the first and second internal electrodes are not directly connected to the first and second terminal electrodes, the range in which the first and second internal electrodes can be arranged in the ceramic element body is not limited to the range of the length of the first and second terminal electrodes. Namely, the first and second internal electrodes can be arranged beyond the range of the length of the first and second terminal electrodes, which enhances design freedom for the arrangement number of internal electrodes.

In the present invention, the number of the first internal connection conductor is set to be smaller than the number of the first internal electrodes and the number of the second internal connection conductor is set to be smaller than the number of the second internal electrodes. For this reason, even if the aforementioned projection occurs in each internal connection conductor, influence of the projection will be extremely small because the number of internal connection conductors is small. In addition, the contact area with the element body is relatively large. As a consequence of these, the joint strength is improved between the first and second terminal electrodes and the ceramic element body.

Preferably, the ceramic element body has first and second principal faces opposed to each other as the external surface, the first and second external connection conductors are arranged on the first principal face, and the first and second terminal electrodes are arranged on the second principal face. In this case, the simple configuration allows more definite implementation of electrical insulation between the first external connection conductor and the second terminal electrode and electrical insulation between the second external connection conductor and the first terminal electrode. This configuration does not inhibit mounting ability and size reduction of the chip-type electronic component.

Preferably, the ceramic element body is comprised of a plurality of ceramic layers laminated together, and the first and second principal faces are parallel to a laminate direction of the plurality of ceramic layers. In this case, a range in the laminate direction of the plurality of ceramic layers in which the first and second internal electrodes can be arranged in the ceramic element body is not limited to the range of the length of the first and second terminal electrodes in the laminate direction. Namely, it becomes feasible to arrange the first and second internal electrodes beyond the range of the length of the first and second terminal electrodes in the laminate direction, and thus this configuration enhances design freedom for the arrangement number of internal electrodes.

Preferably, the ceramic element body is comprised of a plurality of ceramic layers laminated together, a length of the first external connection conductor in a laminate direction of the plurality of ceramic layers is set to be larger than a length of the first terminal electrode in the laminate direction of the plurality of ceramic layers, and a length of the second external connection conductor in the laminate direction of the plurality of ceramic layers is set to be larger than a length of the second terminal electrode in the laminate direction of the plurality of ceramic layers. In this case, the arrangement number of first and second internal electrodes can be increased. Since the lengths of the first and second external connection conductors in the laminate direction are relatively long, contact areas are large between the first and second external connection conductors and the ceramic element body. As a consequence, the joint strength is improved between the first and second external connection conductors and the ceramic element body.

Preferably, the chip-type electronic component further comprises: a plurality of third and fourth internal electrodes arranged alternately in the ceramic element body so as to be opposed at least in part to each other; a third external connection conductor which is arranged on the external surface of the ceramic element body and to which the plurality of third internal electrodes are connected; a fourth external connection conductor which is arranged on the external surface of the ceramic element body and to which the plurality of fourth internal electrodes are connected; third and fourth terminal electrodes arranged on the external surface of the ceramic element body; a third internal connection conductor arranged in the ceramic element body and connecting the third external connection conductor and the third terminal electrode; and a fourth internal connection conductor arranged in the ceramic element body and connecting the fourth external connection conductor and the fourth terminal electrode, wherein the second external connection conductor and the fourth external connection conductor are integrally formed. In this case, it is feasible to realize the chip-type electronic component in an array form. Since the second external connection conductor and the fourth external connection conductor are integrally formed, it is easy to form the second and fourth external connection conductors.

More preferably, the ceramic element body is comprised of a plurality of ceramic layers laminated together, a length of the third external connection conductor in a laminate direction of the plurality of ceramic layers is set to be larger than a length of the third terminal electrode in the laminate direction of the plurality of ceramic layers, and a length of the fourth external connection conductor in the laminate direction of the plurality of ceramic layers is set to be larger than a length of the fourth terminal electrode in the laminate direction of the plurality of ceramic layers. In this case, the arrangement number of third and fourth internal electrodes can be increased. Since the lengths of the third and fourth external connection conductors in the laminate direction are relatively long, contact areas are large between the third and fourth external connection conductors and the ceramic element body. As a consequence, the joint strength is improved between the third and fourth external connection conductors and the ceramic element body.

Preferably, the first and second principal faces are parallel to a direction in which the first internal electrodes and the second internal electrodes are opposed (an opposed direction of the first and second internal electrodes). In this case, the range in the opposed direction of the first and second internal electrodes in which the first and second internal electrodes can be arranged in the ceramic element body is not limited to the range of the length of the first and second terminal electrodes in the opposed direction. Namely, the first and second internal electrodes can be arranged beyond the range of the length of the first and second terminal electrodes in the opposed direction, which enhances design freedom for the arrangement number of internal electrodes.

Preferably, a length of the first external connection conductor in a direction in which the first internal electrodes and the second internal electrodes are opposed (the opposed direction of the first and second internal electrodes) is set to be larger than a length of the first terminal electrode in the opposed direction of the first internal electrodes and the second internal electrodes, and a length of the second external connection conductor in the opposed direction of the first internal electrodes and the second internal electrodes is set to be larger than a length of the second terminal electrode in the opposed direction of the first internal electrodes and the second internal electrodes. In this case, the arrangement number of first and second internal electrodes can be increased. Since the lengths of the first and second external connection conductors in the opposed direction are relatively long, the contact areas are large between the first and second external connection conductors and the ceramic element body. As a consequence, the joint strength is improved between the first and second external connection conductors and the ceramic element body.

Preferably, a length of the third external connection conductor in a direction in which the third internal electrodes and the fourth internal electrodes are opposed (the opposed direction of the third and fourth internal electrodes) is set to be larger than a length of the third terminal electrode in the opposed direction of the third internal electrodes and the fourth internal electrodes, and a length of the fourth external connection conductor in the opposed direction of the third internal electrodes and the fourth internal electrodes is set to be larger than a length of the fourth terminal electrode in the opposed direction of the third internal electrodes and the fourth internal electrodes. In this case, the arrangement number of third and fourth internal electrodes can be increased. Since the lengths of the third and fourth external connection conductors in the opposed direction are relatively long, the contact areas are large between the third and fourth external connection conductors and the ceramic element body. As a consequence, the joint strength is improved between the third and fourth external connection conductors and the ceramic element body.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference symbols, without redundant description.

Figure 1:
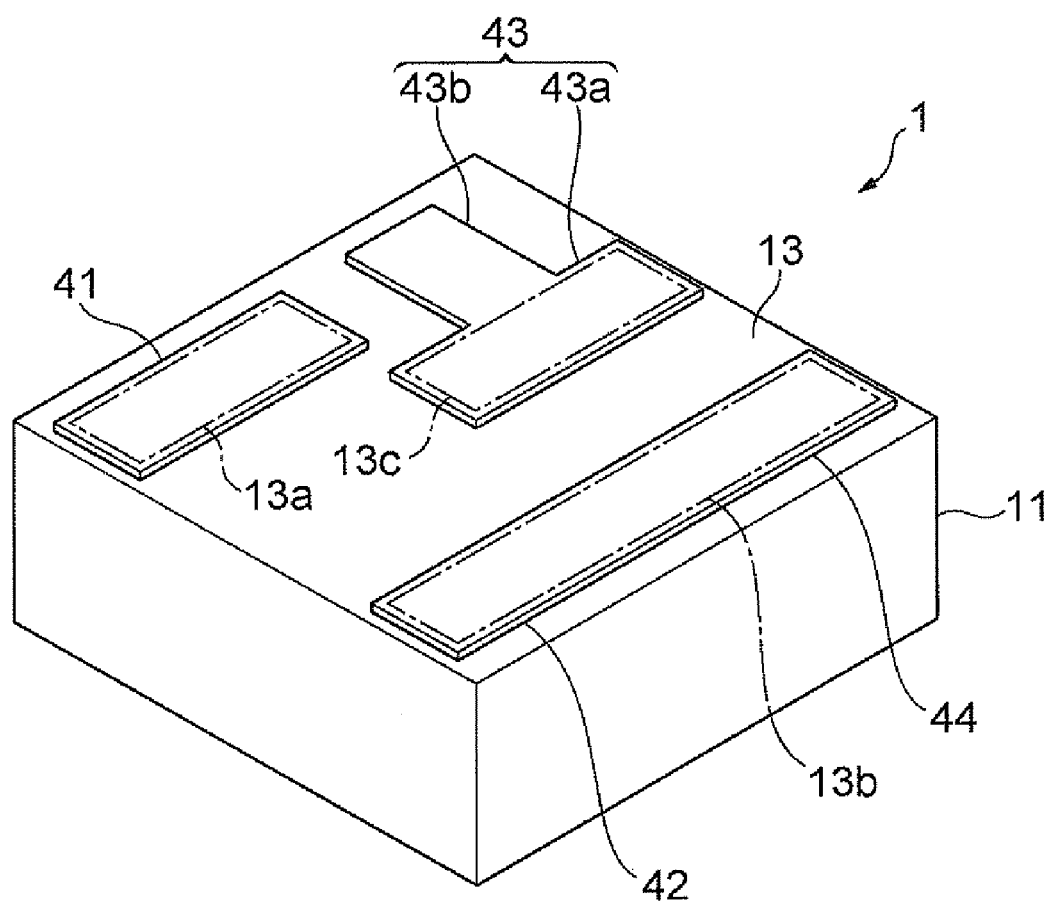
FIG. 1 is a perspective view showing a configuration of a multilayer chip varistor according to an embodiment of the present invention.
Figure 2:
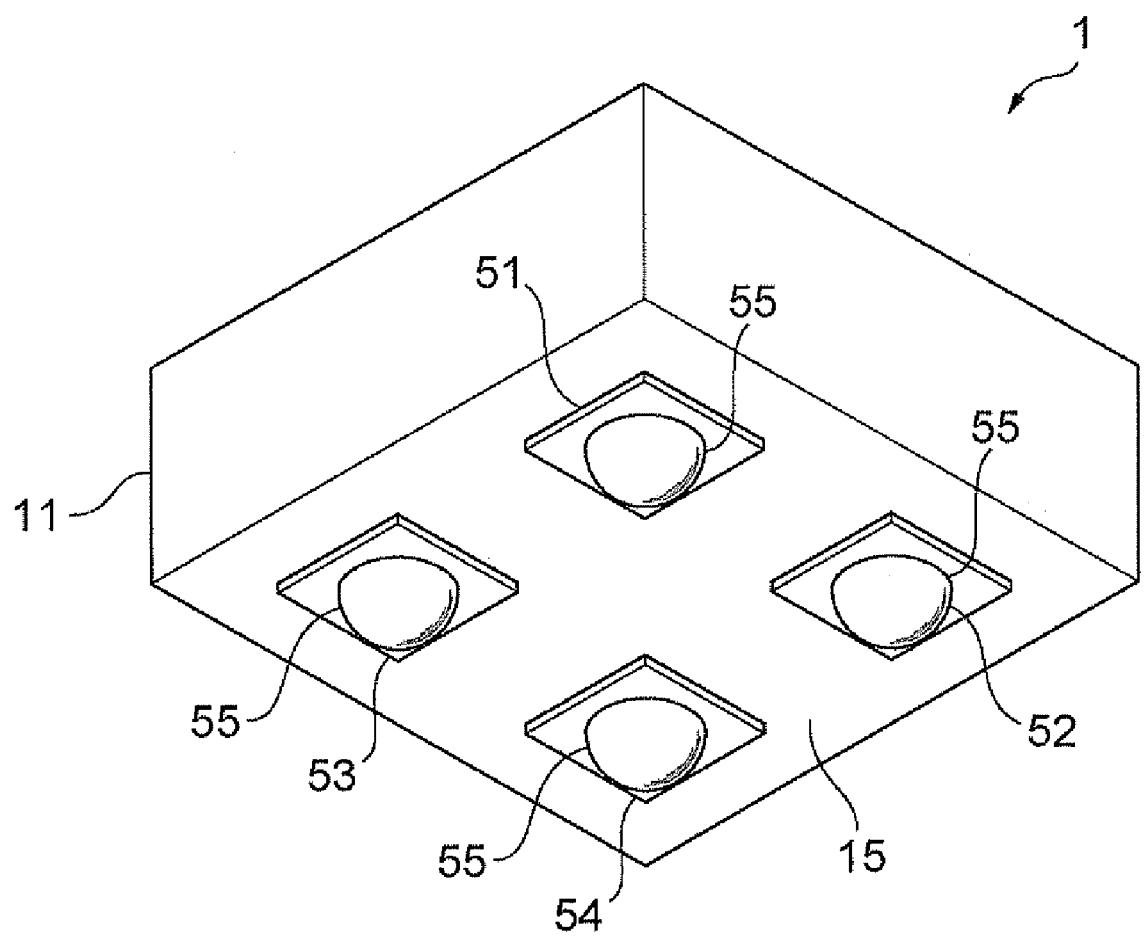
FIG. 2 is a perspective view showing the configuration of the multilayer chip varistor according to the embodiment.
Figure 3:
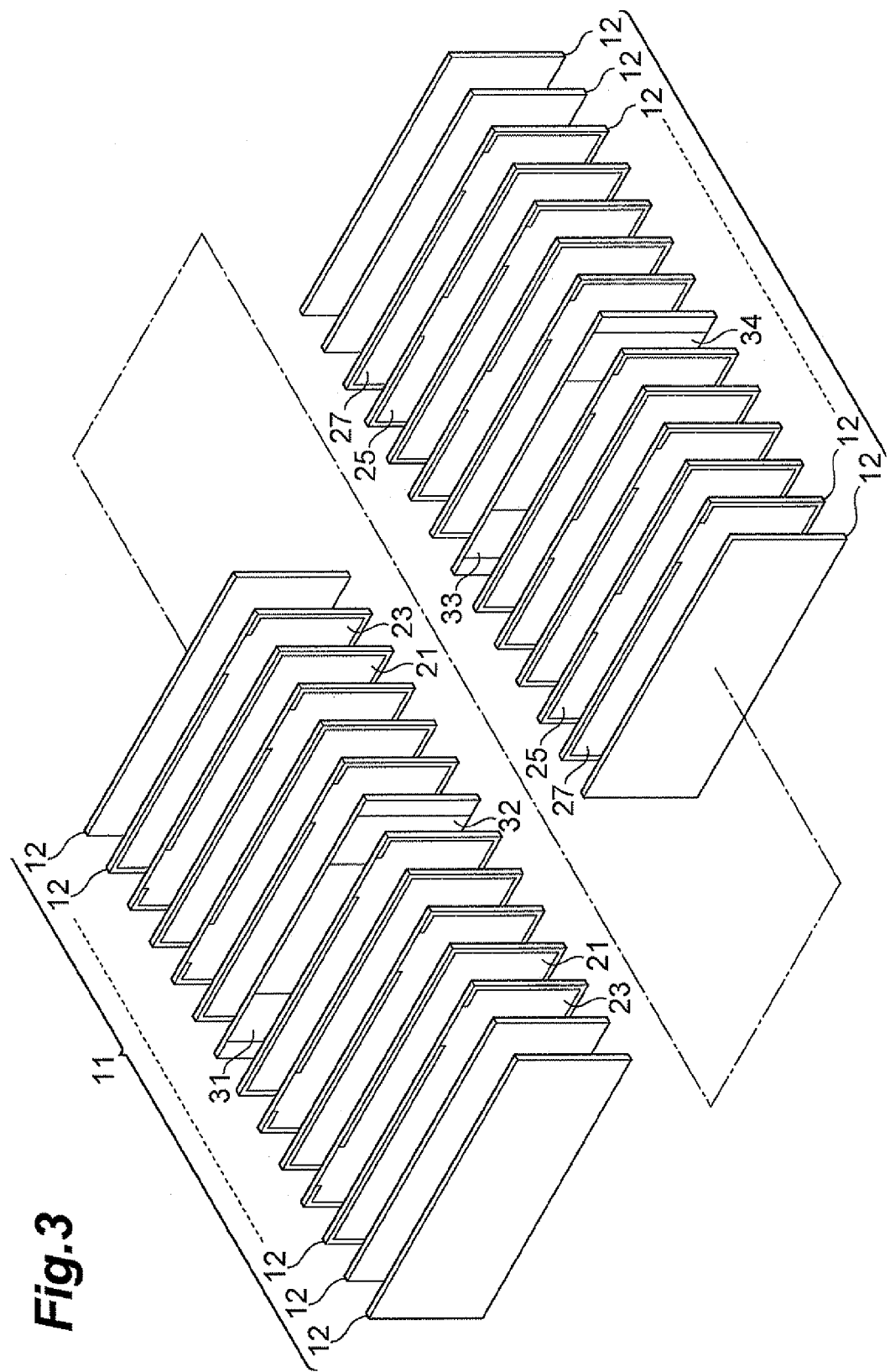
FIG. 3 is an exploded perspective view of a varistor element body included in the multilayer chip varistor of the embodiment.
Figure 5:
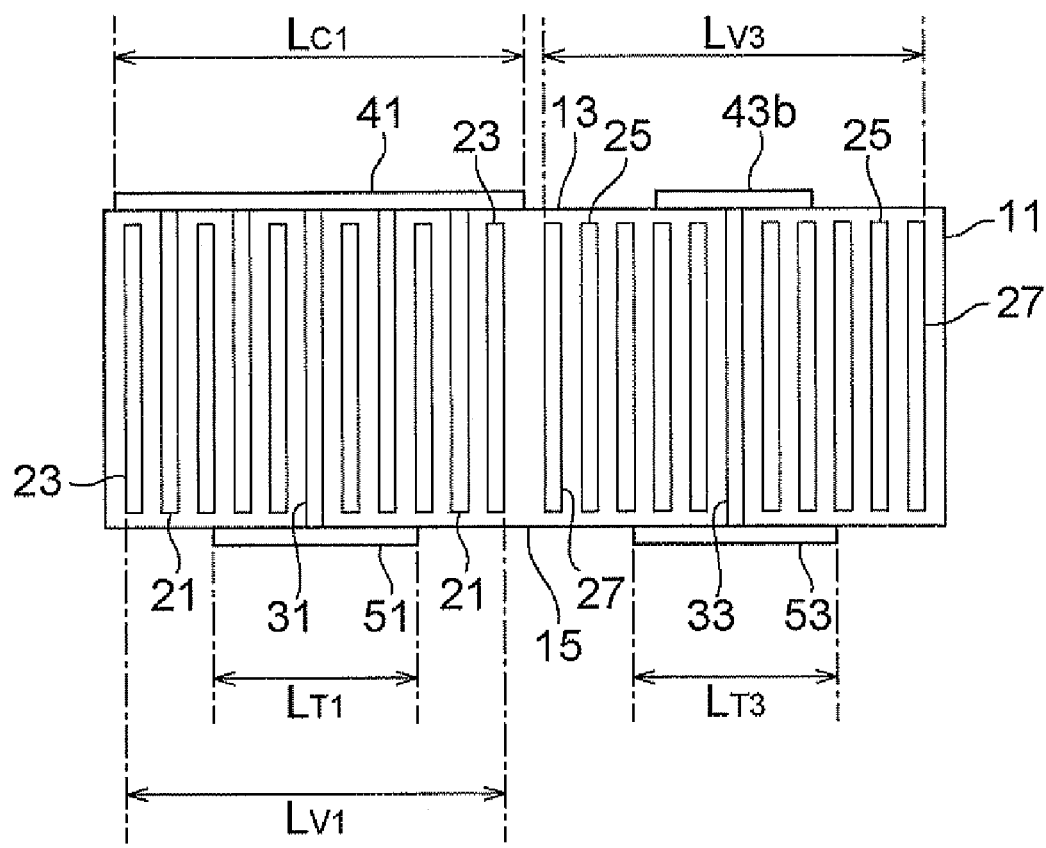
FIG. 5 is a drawing for explaining a sectional configuration of the multilayer chip varistor of the embodiment.
Figure 6:
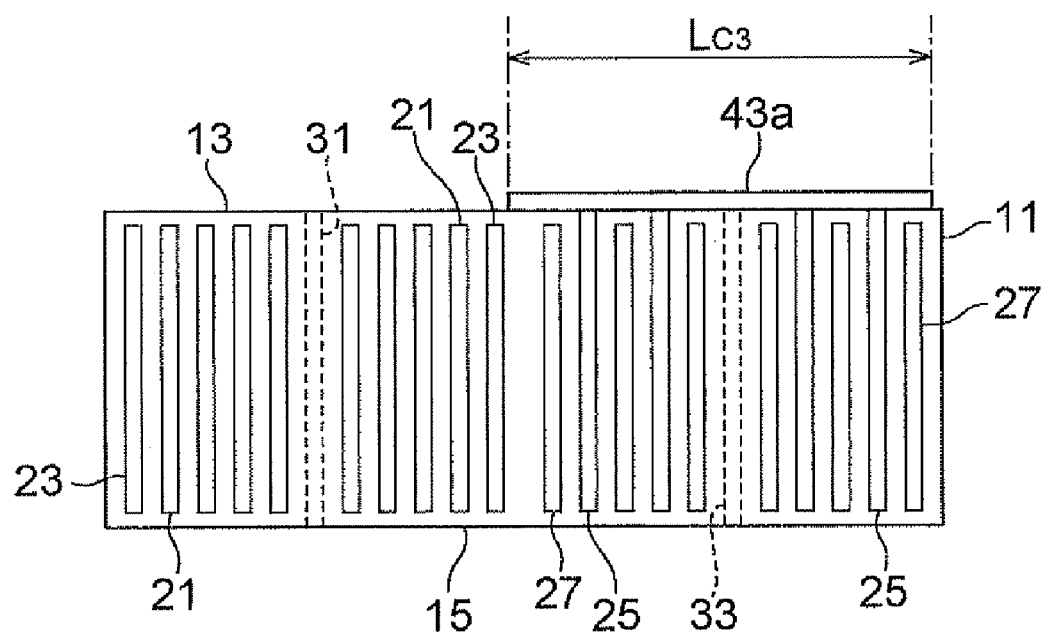
FIG. 6 is a drawing for explaining a sectional configuration of the multilayer chip varistor of the embodiment.
Figure 7:
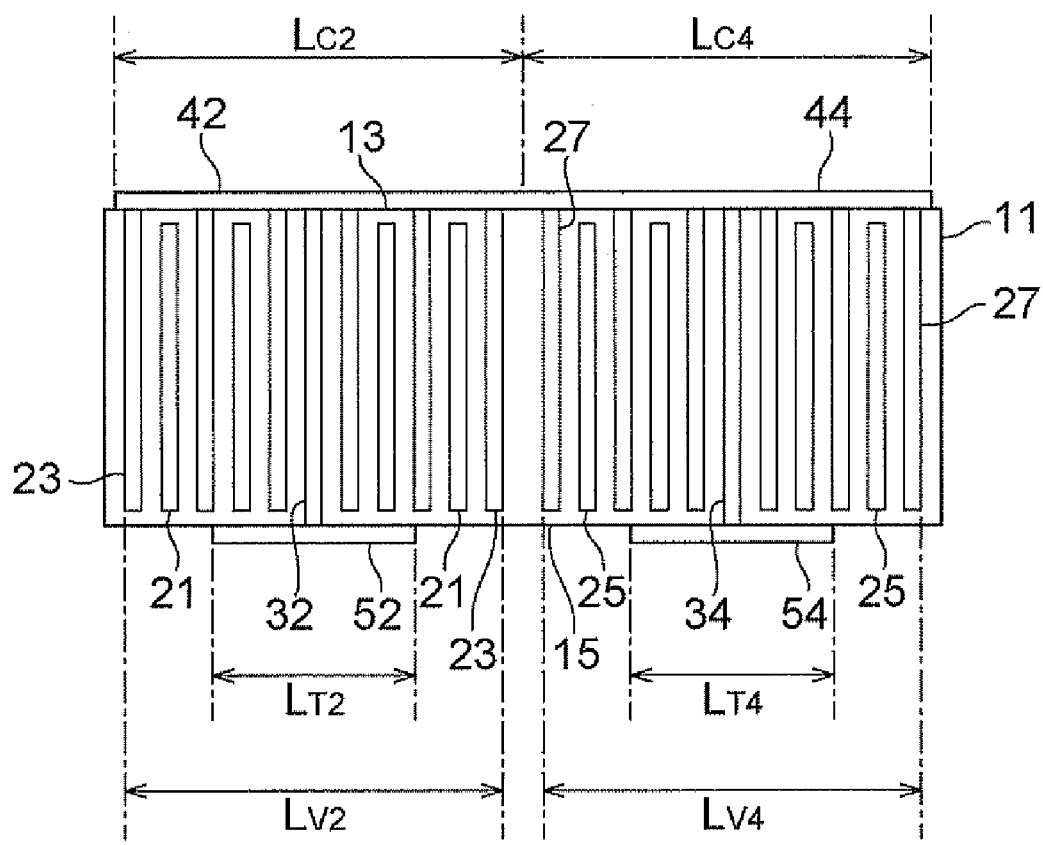
FIG. 7 is a drawing for explaining a sectional configuration of the multilayer chip varistor of the embodiment.

FIG. 1 and FIG. 2 are perspective views showing a configuration of a multilayer chip varistor according to an embodiment of the present invention. FIG. 3 is an exploded perspective view of a varistor element body included in the multilayer chip varistor of the first embodiment. FIGS. 4A to 4E are drawings showing configurations of first and second internal electrodes and first and second internal connection conductors. FIGS. 5 to 7 are drawings for explaining sectional configurations of the multilayer chip varistor of the embodiment.

The multilayer chip varistor 1 of the present embodiment is a varistor element of a so-called BGA (Ball Grid Array) package-compatible type, which is to be mounted on a mounting board (not shown) by reflowing solder bumps provided on the mounting surface side, particularly, in order to meet the demand for high-density mounting in compact electronic equipment such as laptop computers and cell phones.

As shown in FIGS. 1 and 2, the multilayer chip varistor 1 has a varistor element body 11 of a nearly rectangular parallelepiped shape, first to fourth external connection conductors 41-44, first to fourth terminal electrodes 51-54, and projecting electrodes 55. The varistor element body 11 has a pair of first and second principal faces 13, 15 opposed to each other, as an external surface. The second principal face 15 is a face (mounting face) to be opposed to an external device on which the multilayer chip varistor 1 is to be mounted. The second and fourth terminal electrodes 52, 54 function as ground terminal electrodes to be connected to the ground.

The first to fourth external connection conductors 41-44 are arranged on the first principal face 13 of the varistor element body 11. The first to fourth terminal electrodes 51-54 and projecting electrodes 55 are arranged on the second principal face 15 of the varistor element body 11. The exposed portion of the external surface of the varistor element body 11 from the first to fourth external connection conductors 41-44 and the first to fourth terminal electrodes 51-54 is covered by an insulation protecting layer (not shown). The insulation protecting layer can be made by attaching a glaze glass (e.g., a glass consisting of $SiO_2$, ZnO, B, $Al_2O_3$, and so on, or the like) and firing it at a predetermined temperature.

The varistor element body 1, as shown in FIG. 3, is constructed as a laminate in which a plurality of varistor layers 12 having the nonlinear voltage-current characteristics (which will be referred to hereinafter as varistor characteristics) are laminated together. The size of the varistor element body 11 is set, for example, to be 2.1 mm long, 1.6 mm wide, and 0.6 mm thick. The laminate direction of the varistor layers 12 is parallel to the first and second principal faces 13, 15. Namely, the first and second principal faces 13, 15 extend in a direction parallel to the laminate direction of the varistor layers 12. In a practical multilayer chip varistor 1, the plurality of varistor layers 12 are integrally formed so that no boundary can be visually recognized between them. The varistor element body 11 is a ceramic element body in which a plurality of ceramic layers of semiconductor ceramic are laminated together.

Concerning the varistor layers 12, the thickness per layer is, for example, 5-60 μm. The varistor layers 12 contain ZnO (zinc oxide) as a major component and also contain single metals such as rare-earth metals, Co, IIIb elements (B, Al, Ga, In), Si, Cr, Mo, alkali metals (K, Rb, Cs), and alkaline-earth metals (Mg, Ca, Sr, Ba), and/or oxides thereof as minor components. In the present embodiment, the varistor layers contain Pr, Co, Cr, Ca, Si, K, Al, etc. as minor components.

The present embodiment adopts Pr as a rare-earth metal. Pr serves as a material for letting the varistor layers exhibit the varistor characteristics. The reason why Pr is used is that it has excellent nonlinear voltage-current characteristics and little characteristic variation in mass production. The present embodiment uses Ca as an alkaline-earth metal. Ca serves as a material for controlling a sintering property of the ZnO-based varistor material and for improving moisture resistance. The reason why Ca is used is that it improves the nonlinear voltage-current characteristics. There are no particular restrictions on a content of ZnO in each varistor layer 12, but it is preferably in the range of 69.0 atomic % to 99.8 atomic % where the overall material of the varistor layer is 100 atomic %.

The multilayer chip varistor 1, as also shown in FIG. 3, has a plurality of first internal electrodes 21, a plurality of second internal electrodes 23, a plurality of third internal electrodes 25, a plurality of fourth internal electrodes 27, and first to fourth internal connection conductors 31-34 in the varistor element body 11. The plurality of first and second internal electrodes 21, 23 are arranged along the laminate direction of the varistor layers 12 in the varistor element body 11. The plurality of third and fourth internal electrodes 25, 27 are arranged along the laminate direction of the varistor layers 12 in the varistor element body 11. Each internal electrode 21-27 and each internal connection conductor 31-34 are made of an electrically-conductive metal material and in the present embodiment only Pd is used as a major component. The electrically-conductive metal material can be, for example, Ag—Pd, besides Pd mentioned above.

Figure 4A:
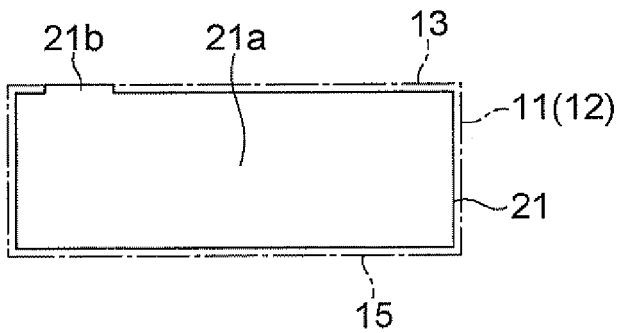
FIGS. 4A to 4E are drawings showing configurations of first and second internal electrodes and first and second internal connection conductors.

Each first internal electrode 21, as shown in FIG. 4A, has a main electrode portion 21a of a rectangular shape, and a lead portion 21b extending from the main electrode portion 21a so that an end thereof is exposed in the first principal face 13. In the present embodiment, the main electrode portion 21a is of a rectangle shape the direction of the long sides of which is a direction perpendicular to the laminate direction of the varistor layers 12 and the opposed direction of the first and second principal faces 13, 15. The main electrode portion 21a and the lead portion 21b are integrally formed. The lead portion 21b extends from a portion near one end of the main electrode portion 21a in the long side on the first principal face 13 side of the main electrode portion 21a, to the first principal face 13.

Figure 4B:
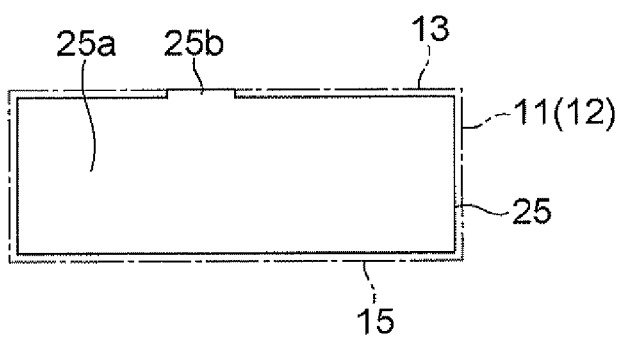

Each third internal electrode 25, as shown in FIG. 4B, has a main electrode portion 25a of a rectangular shape, and a lead portion 25b extending from the main electrode portion 25a so that an end thereof is exposed in the first principal face 13. In the present embodiment, the main electrode portion 25a is of a rectangle shape the direction of the long sides of which is the direction perpendicular to the laminate direction of the varistor layers 12 and the opposed direction of the first and second principal faces 13, 15. The main electrode portion 25a and the lead portion 25b are integrally formed. The lead portion 25b extends from an almost central portion in the long side on the first principal face 13 side of the main electrode portion 25a, to the first principal face 13.

Figure 4C:
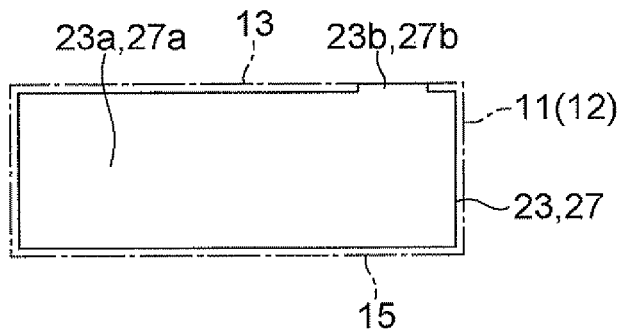

Each of the second and fourth internal electrodes 23, 27, as shown in FIG. 4C, has a main electrode portion 23a, 27a of a rectangular shape, and a lead portion 23b, 27b extending from the main electrode portion 23a, 27a so that an end thereof is exposed in the first principal face 13. In the present embodiment, the main electrode portion 23a, 27a is of a rectangle shape the direction of the long sides of which is the direction perpendicular to the laminate direction of the varistor layers 12 and the opposed direction of the first and second principal faces 13, 15. The main electrode portion 23a, 27a and the lead portion 23b, 27b are integrally formed. The lead portion 23b, 27b extends from a portion near the other end of the main electrode portion 23a, 27a in the long side on the first principal face 13 side of the main electrode portion 23a, 27a, to the first principal face 13.

Figure 4D:
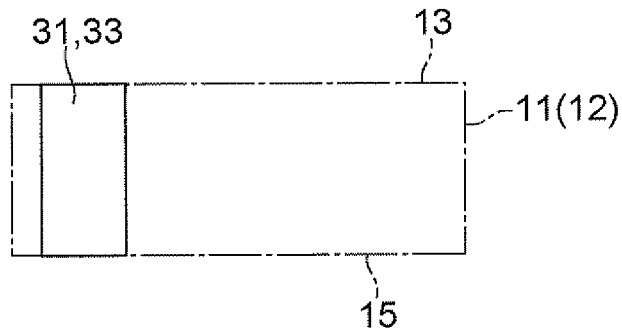
Figure 4E:
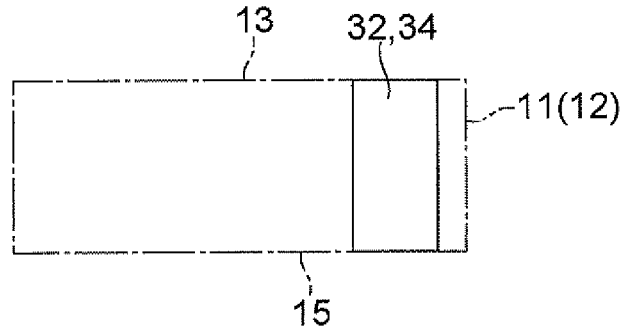

The first and third internal connection conductors 31, 33, as shown in FIG. 4D, are of a rectangular shape and extend in the opposed direction of the first and second principal faces 13, 15 so that one end thereof is exposed in the first principal face 13 and so that the other end thereof is exposed in the second principal face 15. The second and fourth internal connection conductors 32, 34, as shown in FIG. 4E, are of a rectangular shape and extend in the opposed direction of the first and second principal faces 13, 15 so that one end thereof is exposed in the first principal face 13 and so that the other end thereof is exposed in the second principal face 15.

The first internal electrodes 21 and the second internal electrodes 23 are alternately arranged in the laminate direction of the varistor layers 12 and the main electrode portions 21a, 23a thereof are opposed to each other. At least one varistor layer 12 is interposed between each set of first internal electrode 21 and second internal electrode 23. A portion of each varistor layer 12 between the main electrode portions 21a, 23a in the varistor element body 11 exhibits the varistor characteristics, and thus one varistor component is constituted by the portion of the varistor layer 12, the first internal electrode 21, and the second internal electrode 23. The laminate direction of the varistor layers 12 is also the direction in which the first internal electrodes 21 and the second internal electrodes 23 are opposed.

The third internal electrodes 25 and the fourth internal electrodes 27 are alternately arranged in the laminate direction of the varistor layers 12 and the main electrode portions 25a, 27a thereof are opposed to each other. At least one varistor layer 12 is interposed between each set of third internal electrode 25 and fourth internal electrode 27. A portion of each varistor layer 12 between the main electrode portions 25a, 27a in the varistor element body 11 exhibits the varistor characteristics, and thus one varistor component is constituted by the portion of the varistor layer 12, the third internal electrode 25, and the fourth internal electrode 27. The laminate direction of the varistor layers 12 is also the direction in which the third internal electrodes 25 and the fourth internal electrodes 27 are opposed.

The numbers of laminated layers of the first to fourth internal electrodes 21-27 are set, for example, to be five layers each in the present embodiment. The numbers of laminated layers of the first to fourth internal connection conductors 31-34 are set, for example, to be one layer each in the present embodiment.

The first external connection conductor 41 is arranged on the first principal face 13 of the varistor element body 11 and is of a rectangular shape. In the present embodiment, the first external connection conductor 41 is of a rectangle shape the direction of the long sides of which is a direction parallel to the laminate direction of the varistor layers 12. The first external connection conductor 41 is formed to extend in the direction parallel to the laminate direction of the varistor layers 12, so as to cover all the portions of the respective lead portions 21b and the first internal connection conductor 31 exposed in the first principal face 13. The first external connection conductor 41 is physically and electrically connected to each lead portion 21b and the first internal connection conductor 31. This makes all the first internal electrodes 21 and the first internal connection conductor 31 physically and electrically connected to the first external connection conductor 41. For letting the first external connection conductor 41 cover an entire region 13a in which the lead portions 21b and the first internal connection conductor 31 are exposed in the first principal face 13, a predetermined space (margin) is set between the edge of the region 13a and the edge of the first external connection conductor 41.

The third external connection conductor 43 is arranged on the first principal face 13 of the varistor element body 11. The third external connection conductor 43 is of a near T shape and has a first portion 43a extending in the direction parallel to the laminate direction of the varistor layers 12, and a second portion 43b extending in the direction perpendicular to the laminate direction of the varistor layers 12 and the opposed direction of the first and second principal faces 13, 15. The first portion 43a is formed so as to cover all the portions of the respective lead portions 25b exposed in the first principal face 13. The second portion 43b is formed so as to cover all the portion of the third internal connection conductor 33 exposed in the first principal face 13. The third external connection conductor 43 is physically and electrically connected to each lead portion 25b and the third internal connection conductor 33. This makes all the third internal electrodes 25 and the third internal connection conductor 33 physically and electrically connected to the third external connection conductor 43. For letting the first portion 43a cover an entire region 13c in which the lead portions 25b are exposed in the first principal face 13, a predetermined space (margin) is set between the edge of the region 13c and the edge of the first portion 43a.

The first external connection conductor 41 and the region of the first portion 43a of the third external connection conductor 43 are located as shifted in the direction perpendicular to the laminate direction of the varistor layers 12 and the opposed direction of the first and second principal faces 13, 15, corresponding to the positions of the lead portions 21b, 23b. This will prevent contact between the first external connection conductor 41 and the third external connection conductor 43 even if the lengths of the first external connection conductor 41 and the first portion 43a of the third external connection conductor 43 are set longer in the laminate direction of the varistor layers 12. Therefore, electrical insulation is ensured between the first external connection conductor 41 and the third external connection conductor 43.

The second external connection conductor 42 is arranged on the first principal face 13 of the varistor element body 11. The second external connection conductor 42 is formed to extend in the direction parallel to the laminate direction of the varistor layers 12, so as to cover all the portions of the respective lead portions 23b and the second internal connection conductor 32 exposed in the first principal face 13. The second external connection conductor 42 is physically and electrically connected to each lead portion 23b and the second internal connection conductor 32. This makes all the second internal electrodes 23 and the second internal connection conductor 32 physically and electrically connected to the second external connection conductor 42.

The fourth external connection conductor 44 is arranged on the first principal face 13 of the varistor element body 11. The fourth external connection conductor 44 is formed to extend in the direction parallel to the laminate direction of the varistor layers 12, so as to cover all the portions of the respective lead portions 27b and the fourth internal connection conductor 34 exposed in the first principal face 13. The fourth external connection conductor 44 is physically and electrically connected to each lead portion 27b and the fourth internal connection conductor 34. This makes all the fourth internal electrodes 27 and the fourth internal connection conductor 34 physically and electrically connected to the fourth external connection conductor 44.

In the present embodiment, the second external connection conductor 42 and the fourth external connection conductor 44 are integrally formed and are of a rectangle shape the direction of the long sides of which is the direction parallel to the laminate direction of the varistor layers 12. For letting the second and fourth external connection conductors 42, 44 cover an entire region 13b in which the lead portions 23b, 27b and the second and fourth internal connection conductors 32, 34 are exposed in the first principal face 13, a predetermined space (margin) is set between the edge of the region 13b and the edge of the second and fourth external connection conductors 42, 44.

The first to fourth external connection conductors 41-44 contain Pd and Ag. The first to fourth external connection conductors 41-44 are made by sintering an electroconductive paste as described below. The electroconductive paste used herein is a mixture obtained by mixing a glass frit, an organic binder, and an organic solvent in a metal powder a major component of which is an Ag—Pd alloy powder. The first to fourth external connection conductors 41-44 may contain only Pd as a major component.

The first to fourth terminal electrodes 51-54, as also shown in FIG. 2, are arranged in a matrix of two rows×two columns on the second principal face 15 side of the varistor element body 11.

The first terminal electrode 51 is of a rectangular shape and is formed so as to cover all the portion of the first internal connection conductor 31 exposed in the second principal face 15. The first terminal electrode 51 is physically and electrically connected to the first internal connection conductor 31. This makes all the first internal electrodes 21 electrically connected to the first terminal electrode 51 through the first external connection conductor 41 and the first internal connection conductor 31.

The second terminal electrode 52 is of a rectangular shape and is formed so as to cover all the portion of the second internal connection conductor 32 exposed in the second principal face 15. The second terminal electrode 52 is physically and electrically connected to the second internal connection conductor 32. This makes all the second internal electrodes 23 electrically connected to the second terminal electrode 52 through the second external connection conductor 42 and the second internal connection conductor 32.

The third terminal electrode 53 is of a rectangular shape and is formed so as to cover all the portion of the third internal connection conductor 33 exposed in the second principal face 15. The third terminal electrode 53 is physically and electrically connected to the third internal connection conductor 33. This makes all the third internal electrodes 25 electrically connected to the third terminal electrode 53 through the third external connection conductor 43 and the third internal connection conductor 33.

The fourth terminal electrode 54 is of a rectangular shape and is formed so as to cover all the portion of the fourth internal connection conductor 34 exposed in the second principal face 15. The fourth terminal electrode 54 is physically and electrically connected to the fourth internal connection conductor 34. This makes all the fourth internal electrodes 27 electrically connected to the fourth terminal electrode 54 through the fourth external connection conductor 44 and the fourth internal connection conductor 34. Since in the present embodiment the second external connection conductor 42 and the fourth external connection conductor 44 are integrally formed, the second internal electrodes 23 are also electrically connected to the fourth terminal electrode 54 and the fourth internal electrodes 27 are also electrically connected to the second terminal electrode 52.

Each of the first to fourth terminal electrodes 51-54 has a first electrode layer and a second electrode layer. The first electrode layer is formed on the second principal face 15 of the varistor element body 11 and contains metal and a glass material. The first electrode layer contains Ag and Pd as the metal. The first electrode layer is a fired electrode layer formed by sintering an electroconductive paste containing a metal powder (Ag—Pd alloy powder) and a glass powder. The first electrode layer may contain only Pd as a major component.

The second electrode layer is formed on the first electrode layer and contains Pt. The second electrode layer is a fired electrode layer formed by firing an electroconductive paste containing a Pt powder. The second electrode layer may contain a glass material. The second electrode layer can also be formed by evaporation or plating, besides the firing of the electroconductive paste. The thickness of the first electrode layer is, for example, 1-20 μm. The thickness of the second electrode layer is smaller than that of the first electrode layer and is, for example, 0.1-5 μm.

The first to fourth terminal electrodes 51-54 do not have to be limited to the two-layer configuration having the aforementioned first and second electrode layers, but may be constructed in a single-layer configuration having one electrode layer. When the first to fourth terminal electrodes 51-54 each are composed of one electrode layer, the electrode layer can be, for example, a fired electrode layer formed by firing an electroconductive paste containing a Pt powder.

The below will describe a relation among the lengths of the first to fourth external connection conductors 41-44 and the first to fourth terminal electrodes 51-54 on a view from the direction perpendicular to the laminate direction of the varistor layers 12 and the opposed direction of the first and second principal faces 13, 15, with reference to FIGS. 5 to 7. The length $L_{C1}$ of the first external connection conductor 41 in the laminate direction of the varistor layers 12, as shown in FIG. 5, is set to be larger than the length $L_{T1}$ of the first terminal electrode 51 in the laminate direction of the varistor layers 12. The length $L_{C3}$ of the third external connection conductor 43 in the laminate direction of the varistor layers 12, as shown in FIGS. 5 and 6, is set to be larger than the length $L_{T3}$ of the third terminal electrode 53 in the laminate direction of the varistor layers 12. The length $L_{C2}$ of the second external connection conductor 42 in the laminate direction of the varistor layers 12, as shown in FIG. 7, is set to be larger than the length $L_{T2}$ of the second terminal electrode 52 in the laminate direction of the varistor layers 12. Similarly, the length $L_{C4}$ of the fourth external connection conductor 44 in the laminate direction of the varistor layers 12 is set to be larger than the length $L_{T4}$ of the fourth terminal electrode 54 in the laminate direction of the varistor layers 12.

In the present embodiment, the length $L_{V1}$, $L_{V2}$ of the region where the first and second internal electrodes 21, 23 are arranged, in the laminate direction of the varistor layers 12 is set to be larger than the lengths $L_{T1}$, $L_{T2}$ of the first and second terminal electrodes 51, 52. The length $L_{V3}$, $L_{V4}$ of the region where the third and fourth internal electrodes 25, 27 are arranged, in the laminate direction of the varistor layers 12 is set to be larger than the lengths $L_{T3}$, $L_{T4}$ of the third and fourth terminal electrodes 53, 54.

The projecting electrodes (so called bump electrodes) 55 consist of solder containing Sn and are arranged on the respective terminal electrodes 51-54. The projecting electrodes 55 are electrically and physically connected to the respective terminal electrodes 51-54. The solder is so-called lead-free solder and is, for example, Sn—Ag—Cu solder, Sn—Zn solder, or the like. The projecting electrodes 55 can be formed by printing. Besides the printing, the projecting electrodes 55 can also be formed by a dispensing method, a ball mounting method, evaporation, plating, or the like.

The multilayer chip varistor 1 of the present embodiment is the arrayed multilayer chip varistor having two varistor components, as described above.

The following will describe a production method of the multilayer chip varistor 1.

First, a varistor material is prepared by mixing ZnO as a major component forming the varistor layers 12, Pr and Ca as minor components, and Co, Cr, Si, K, and Al as other minor components at a predetermined ratio. After the preparation, an organic binder, an organic solvent, an organic plasticizer, etc. are added into the varistor material and the mixture is mixed and pulverized with a ball mill or the like for about 20 hours to obtain a slurry.

Next, the slurry is applied onto film (not shown), for example, of polyethylene terephthalate, for example, by the doctor blade method and is dried to form membranes in the thickness of about 30 μm. The membranes obtained in this manner are peeled off the film to obtain green sheets.

Next, electrode portions corresponding to the first internal electrodes 21 are formed on green sheets, electrode portions corresponding to the second internal electrodes 23 on different green sheets, electrode portions corresponding to the third internal electrodes 25 on different green sheets, and electrode portions corresponding to the fourth internal electrodes 27 on different green sheets. Electrode portions corresponding to the first and second internal connection conductors 31, 32 are formed on different green sheets and electrode portions corresponding to the third and fourth internal connection conductors 33, 34 on different green sheets. Each of the electrode portions is formed by printing an electroconductive paste obtained by mixing a metal powder containing only Pd as a major component, an organic binder, an organic solvent, etc., for example, by screen printing, and drying it.

Then the green sheets with the electrode portions and the green sheets without any electrode portion are stacked in a predetermined order to form a sheet laminate body. Then the sheet laminate body is cut in chip units to obtain a plurality of split green bodies.

Thereafter, each green body is heated to be debindered, for example, at the temperature of 180° C.-400° C. for about 0.5-24 hours. Then the green body is fired, for example, at the temperature of 850° C.-1400° C. for about 0.5-8 hours. This firing results in turning the green sheets into the varistor layers 12 and the electrode portions into the corresponding internal electrodes 21-27 or internal connection conductors 31-34, to obtain the varistor element body 11.

After completion of the varistor element body 11, the first to fourth external connection conductors 41-44 and the first to fourth terminal electrodes 51-54 each are formed on the first and second principal faces 13, 15 of the varistor element body 11. More specifically, for forming the first to fourth external connection conductors 41-44, an electroconductive paste is first prepared by mixing a glass powder, an organic binder, and an organic solvent in a metal powder (Ag—Pd alloy powder) containing Pd and Ag. Next, the electroconductive paste prepared is deposited on the first principal face 13 of the varistor element body 11, for example, by screen printing and is dried to form conductor portions corresponding to the first to fourth external connection conductors 41-44. The glass powder can be a glass frit containing at least one of B, Bi, Al, Si, Sr, Ba, Pr, Zn, and Pb.

For forming the first to fourth terminal electrodes 51-54, first, a first electroconductive paste is prepared by mixing a glass powder, an organic binder, and an organic solvent in a metal powder (Ag—Pd alloy powder) containing Pd and Ag, and a second electroconductive paste is prepared by mixing an organic binder and an organic solvent in a metal powder containing Pt (Pt powder). Then the first electroconductive paste prepared is deposited on the second principal face 15 of the varistor element body 11, for example, by screen printing and is dried to form conductor portions corresponding to the first electrode layers. Then the second electroconductive paste prepared is deposited on the first electrode layers, for example, by screen printing and dried to form conductor portions corresponding to the second electrode layers. The glass powder can be a glass frit containing at least one of B, Bi, Al, Si, Sr, Ba, Pr, Zn, and Pb.

Then the conductor portions thus formed are sintered, for example, at 900° C., whereby the conductor portions turn into the corresponding external connection conductors 41-44 and terminal electrodes 51-54 (first and second electrode layers). Any plated layer of Ni or Sn employed in the conventional technology is not formed on the surfaces of the terminal electrodes 51-54, and, therefore, the external surfaces of the electroconductive paste after sintered become the external surfaces of the terminal electrodes 51-54 as they are. Thereafter, the projecting electrodes 55 are formed on the respective terminal electrodes 51-54 by a known forming method, thereby completing the aforementioned multilayer chip varistor 1.

In the present embodiment, as described above, the first internal electrodes 21 are not directly connected to the first terminal electrode 51 but are electrically connected to the first terminal electrode 51 through the first external connection conductor 41 and the first internal connection conductor 31. The second internal electrodes 23 are not directly connected to the second terminal electrode 52 but are electrically connected to the second terminal electrode 52 through the second external connection conductor 42 and the second internal connection conductor 32. The third internal electrodes 25 are not directly connected to the third terminal electrode 53 but are electrically connected to the third terminal electrode 53 through the third external connection conductor 43 and the third internal connection conductor 33. The fourth internal electrodes 27 are not directly connected to the fourth terminal electrode 54 but are electrically connected to the fourth terminal electrode 54 through the fourth external connection conductor 44 and the fourth internal connection conductor 34.

As described above, the first and second internal electrodes 21, 23 are not directly connected to the first and second terminal electrodes 51, 52 and, therefore, the range in the laminate direction of the varistor layers 12 where the first and second internal electrodes 21, 23 can be arranged in the varistor element body 11 is not limited to the range of the lengths $L_{T1}$, $L_{T2}$ in the laminate direction of the first and second terminal electrodes 51, 52. The third and fourth internal electrodes 25, 27 are not directly connected to the third and fourth terminal electrodes 53, 54 and, therefore, the range in the laminate direction of the varistor layers 12 where the third and fourth internal electrodes 25, 27 can be arranged in the varistor element body 11 is not limited to the range of the lengths $L_{T3}$, $L_{T4}$ in the laminate direction of the third and fourth terminal electrodes 53, 54. Namely, it becomes feasible to arrange the first to fourth internal electrodes 21-27 beyond the ranges of the lengths $L_{T1}$-$L_{T4}$ in the laminate direction of the first to fourth terminal electrodes 51-54, which enhances design freedom for the numbers of laminated layers of the first to fourth internal electrodes 21-27. By increasing the numbers of laminated layers of the first to fourth internal electrodes 21-27, the capacitance of the multilayer chip varistor 1 can be set at a high value.

In the present embodiment, the number of each internal connection conductor 31-34 is set to be smaller than the number of corresponding internal electrodes 21-27. Even if there occurs the "projection" such that an end of each internal connection conductor 31-34 grows to project through the second principal face 15, influence of the projection will be extremely small because of the smaller number of each internal connection conductor 31-34, when compared with the conventional chip-type electronic components. As the number of each internal connection conductor 31-34 is smaller, the contact areas become larger between the first to fourth terminal electrodes 51-54 and the varistor element body 11 when compared with the conventional chip-type electronic components. As a consequence of these, the joint strength is improved between the first to fourth terminal electrodes 51-54 and the varistor element body 11.

The projection of each internal electrode 21-27 and each internal connection conductor 31-34 can occur on the first principal face 13 side. However, even if there occurs the projection of each internal electrode 21-27 and each internal connection conductor 31-34, an external impact is less likely to be directly applied to the first to fourth external connection conductors 41-44 and a possibility of raising the problem of delamination of the first to fourth external connection conductors 41-44 is extremely low.

The first to fourth external connection conductors 41-44 are relatively less required in terms of mechanical strength against delamination than the first to fourth terminal electrodes 51-54. In contrast to it, they are more required in terms of achieving secure electrical connection to each internal electrode 21-27 and each internal connection conductor 31-34. In the present embodiment, therefore, the constituent material can be selected for the first to fourth external connection conductors 41-44 with priority to the aspect of achieving secure electrical connection to each internal electrode 21-27 and each internal connection conductor 31-34.

In the present embodiment, the first to fourth external connection conductors 41-44 are arranged on the first principal face 13 and the first to fourth terminal electrodes 51-54 are arranged on the second principal face 15. For this reason, it is feasible to definitely realize the electrical insulation between the first and third external connection conductors 41, 43 and the second and fourth terminal electrodes 52, 54 and the electrical insulation between the second and fourth external connection conductors 42, 44 and the first and third terminal electrodes 51, 53 by the simple configuration. This configuration does not inhibit mounting ability and size reduction of the multilayer chip varistor 1.

In the present embodiment, since the lengths $L_{C1}$-$L_{C4}$ of the first to fourth external connection conductors 41-44 in the laminate direction of the varistor layers 12 are set to be larger than the lengths $L_{T1}$-$L_{T4}$ of the first to fourth terminal electrodes 51-54 in the laminate direction of the varistor layers 12, it is possible to increase the numbers of laminated layers of the first to fourth internal electrodes 21-27. Since the lengths $L_{C1}$-$L_{C4}$ of the first to fourth external connection conductors 41-44 in the laminate direction are relatively long, the contact areas are large between the first to fourth external connection conductors 41-44 and the varistor element body 11, whereby the joint strength is improved between the first to fourth external connection conductors 41-44 and the varistor element body 11.

In the present embodiment, the second external connection conductor 42 and the fourth external connection conductor 44 are integrally formed, and it is thus easy to form the second and fourth external connection conductors 42, 44.

Figure 8:
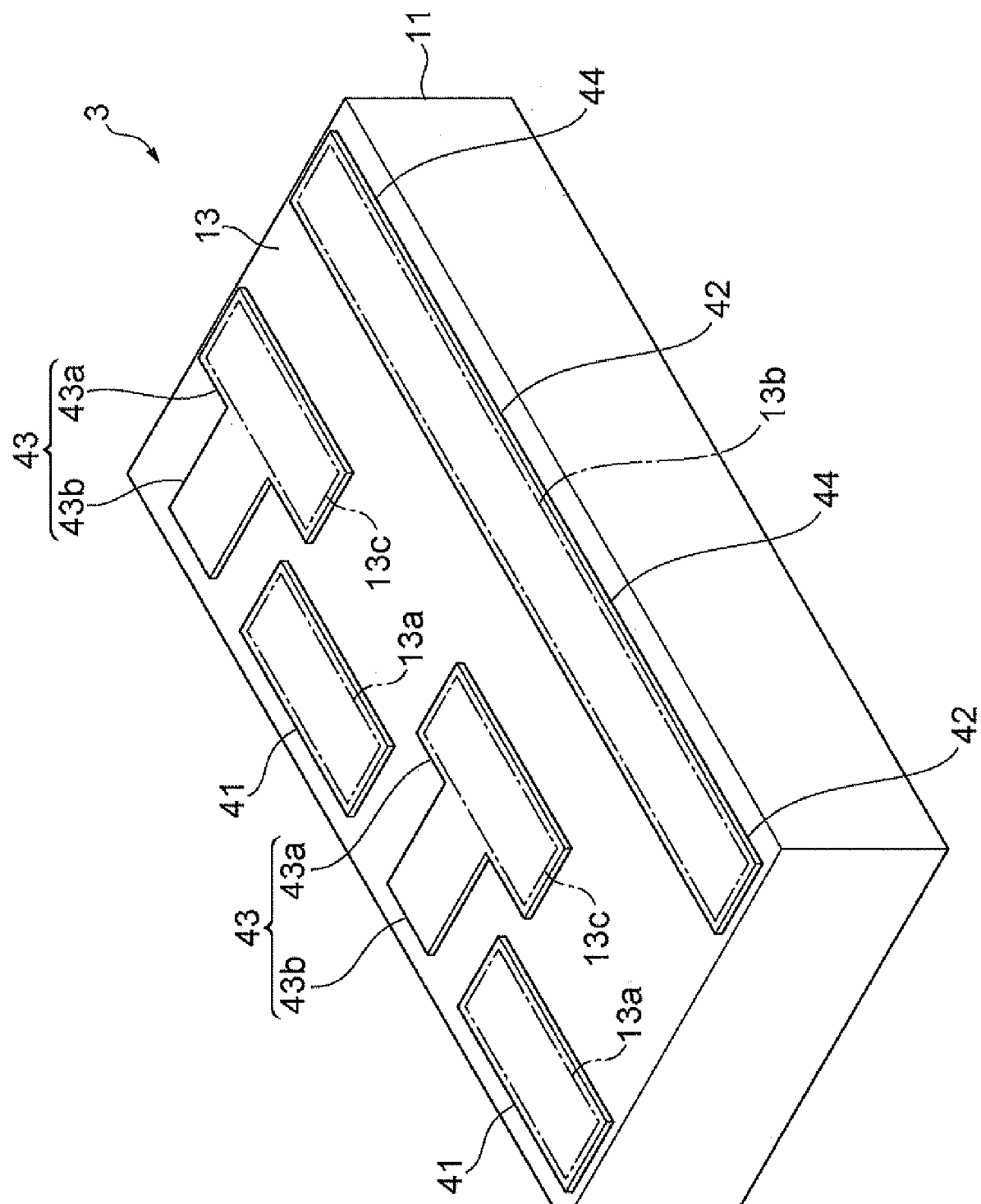
FIG. 8 is a perspective view showing a configuration of a multilayer chip varistor according to a modification example of the embodiment.
Figure 9:
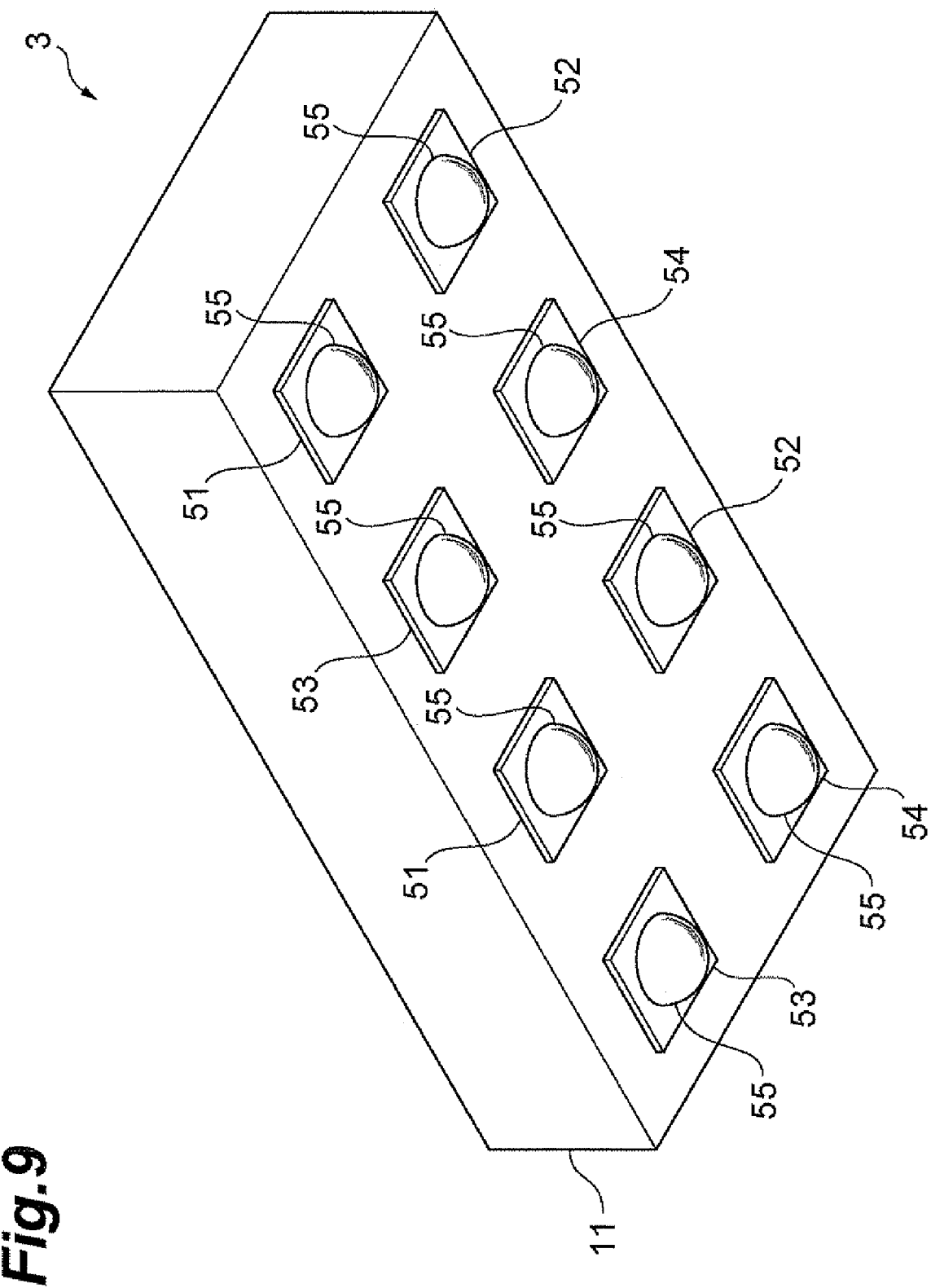
FIG. 9 is a perspective view showing the configuration of the multilayer chip varistor according to the modification example of the embodiment.
Figure 10:
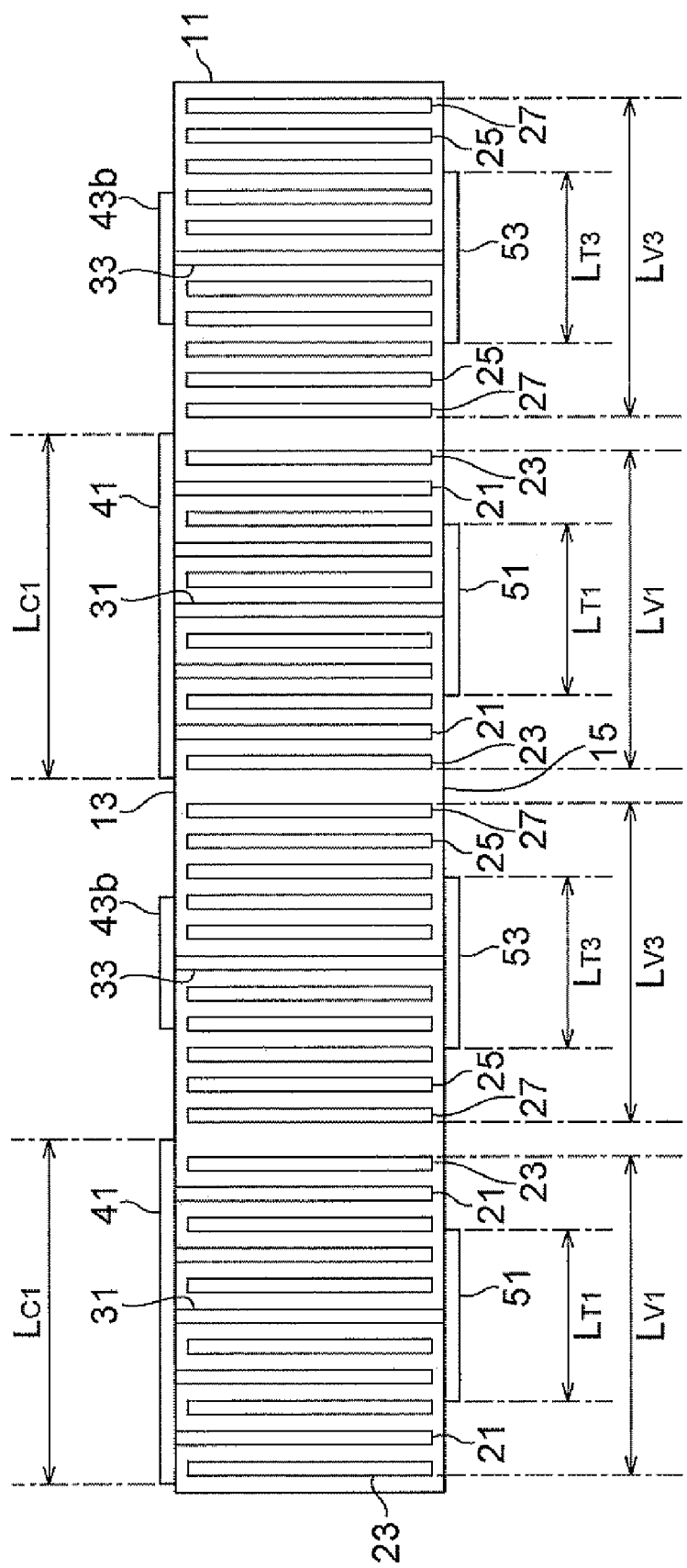
FIG. 10 is a drawing for explaining a sectional configuration of the multilayer chip varistor according to the modification example of the embodiment.
Figure 11:
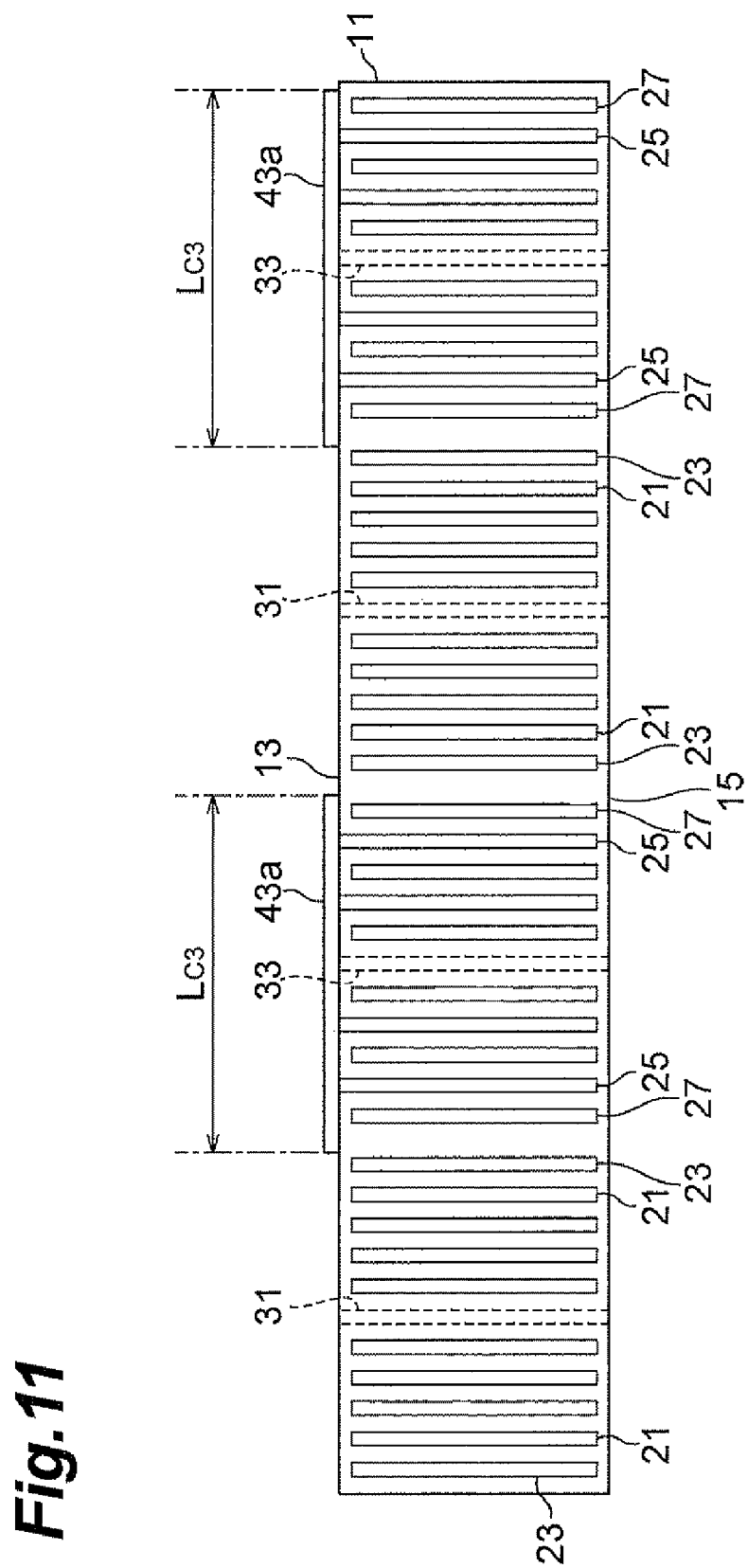
FIG. 11 is a drawing for explaining a sectional configuration of the multilayer chip varistor according to the modification example of the embodiment.
Figure 12:
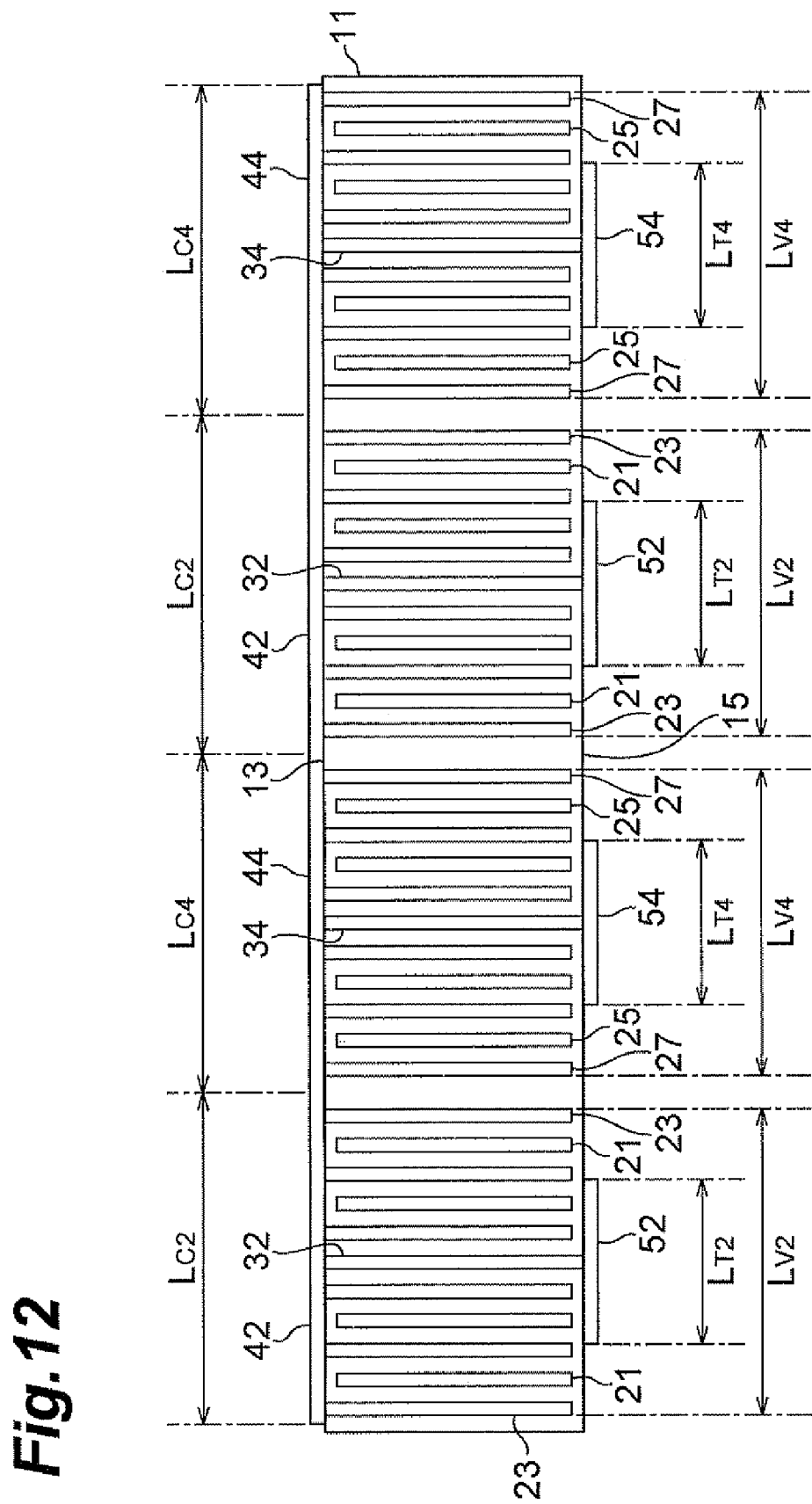
FIG. 12 is a drawing for explaining a sectional configuration of the multilayer chip varistor according to the modification example of the embodiment.

A modification example of the above embodiment will be described below with reference to FIGS. 8 to 12. FIG. 8 and FIG. 9 are perspective views showing a configuration of a multilayer chip varistor according to the modification example. FIGS. 10 to 12 are drawings for explaining sectional configurations of the multilayer chip varistor of the modification example.

The multilayer chip varistor 3 of the modification example is different from the aforementioned multilayer chip varistor 1 in that it is the multilayer chip varistor in the array form having four varistor components. In the multilayer chip varistor 3 of the modification example, design freedom is also enhanced for the numbers of laminated layers of the first to fourth internal electrodes 21-27 and the joint strength is also improved between the first to fourth terminal electrodes 51-54 and the varistor element body 11.

The above described the preferred embodiment of the present invention, but it is noted that the present invention is by no means limited to the above embodiment but can be modified in various ways without departing from the spirit and scope of the invention.

The present embodiment and modification example disclosed the examples of application of the present invention to the multilayer chip varistors in the array form, but, without having to be limited to this, the present invention can be applied to a multilayer chip varistor having only one varistor component. The present invention is also applicable to multilayer chip capacitors, multilayer composite electronic components including a varistor or capacitor, etc., without being limited to the multilayer chip varistors.

The numbers of laminated layers of the first to fourth internal electrodes 21-27, the numbers of the first to fourth internal connection conductors 31-34, etc. are not limited to the numbers (numbers of laminated layers) disclosed in the above embodiment and modification example.

In the above embodiment and modification example the first and second internal connection conductors 31, 32 are located in an identical layer, but it is a matter of course that they may be located in different layers. The third and fourth internal connection conductors 33, 34 do not have to be located in an identical layer, either, and may be located in different layers.

The second external connection conductor 42 and the fourth external connection conductor 44 may be formed separately. Namely, the second external connection conductor 42 and the fourth external connection conductor 44 may be located with a predetermined space in the direction parallel to the laminate direction of the varistor layers 12.

The first to fourth external connection conductors 41-44 do not always have to be located on the first principal face 13. For example, the first to fourth external connection conductors 41-44 may be located on a side face extending so as to connect the first and second principal faces 13, 15. In this case, the first to fourth external connection conductors 41-44 all do not have to be located on the same side face. For example, the first and third external connection conductors 41, 43 may be located on one side face out of a pair of side faces opposed in the direction perpendicular to the laminate direction of the varistor layers 12 and the opposed direction of the first and second principal faces 13, 15, and the second and fourth external connection conductors 42, 44 may be located on the other side face out of the pair of side faces.

In the multilayer chip varistors, multilayer chip capacitors, etc., the numbers of laminated layers of internal electrodes are generally set according to a desired capacitance. Therefore, the length $L_{V1}$ in the laminate direction of the varistor layers 12, of the region where the first and second internal electrodes 21, 23 are arranged is set to be larger than the lengths $L_{T1}$, $L_{T2}$ of the first and second terminal electrodes 51, 52, and the length $L_{V2}$ in the laminate direction of the varistor layers 12, of the region where the third and fourth internal electrodes 25, 27 are arranged is set to be larger than the lengths $L_{T3}$, $L_{T4}$ of the third and fourth terminal electrodes 53, 54, but the length relation is not limited to this. The numbers of laminated layers of the internal electrodes may be reduced whereby the length relation is set as follows: the length $L_{V1}$, $L_{V2}$ in the laminate direction of the varistor layers 12, of the region where the first and second internal electrodes 21, 23 are arranged is set to be equal to or smaller than the lengths $L_{T1}$, $L_{T2}$ of the first and second terminal electrodes 51, 52; and the length $L_{V3}$, $L_{V4}$ in the laminate direction of the varistor layers 12, of the region where the third and fourth internal electrodes 25, 27 are arranged is set to be equal to or smaller than the lengths $L_{T3}$, $L_{T4}$ of the third and fourth terminal electrodes 53, 54.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A chip-type electronic component comprising:
    a ceramic element body;
    a plurality of first and second internal electrodes arranged in the ceramic element body so as to be opposed at least in part to each other;
    a first external connection conductor which is arranged on an external surface of the ceramic element body and to which the plurality of first internal electrodes are connected;
    a second external connection conductor which is arranged on the external surface of the ceramic element body and to which the plurality of second internal electrodes are connected;
    first and second terminal electrodes arranged on the external surface of the ceramic element body;
    a first internal connection conductor arranged in the ceramic element body and connecting the first external connection conductor and the first terminal electrode; and
    a second internal connection conductor arranged in the ceramic element body and connecting the second external connection conductor and the second terminal electrode,
    wherein the number of the first internal connection conductor is set to be smaller than the number of the first internal electrodes, and
    wherein the number of the second internal connection conductor is set to be smaller than the number of the second internal electrodes.

2. The chip-type electronic component according to claim 1,
    wherein the ceramic element body has first and second principal faces opposed to each other as the external surface, and
    wherein the first and second external connection conductors are arranged on the first principal face and the first and second terminal electrodes are arranged on the second principal face.

3. The chip-type electronic component according to claim 1,
    wherein the ceramic element body is comprised of a plurality of ceramic layers laminated together, and
    wherein the first and second principal faces are parallel to a laminate direction of the plurality of ceramic layers.

4. The chip-type electronic component according to claim 1,
    wherein the ceramic element body is comprised of a plurality of ceramic layers laminated together, wherein a length of the first external connection conductor in a laminate direction of the plurality of ceramic layers is set to be larger than a length of the first terminal electrode in the laminate direction of the plurality of ceramic layers, and wherein a length of the second external connection conductor in the laminate direction of the plurality of ceramic layers is set to be larger than a length of the second terminal electrode in the laminate direction of the plurality of ceramic layers.

5. The chip-type electronic component according to claim 1, further comprising:

a plurality of third and fourth internal electrodes arranged alternately in the ceramic element body so as to be opposed at least in part to each other;

a third external connection conductor which is arranged on the external surface of the ceramic element body and to which the plurality of third internal electrodes are connected;

a fourth external connection conductor which is arranged on the external surface of the ceramic element body and to which the plurality of fourth internal electrodes are connected;

third and fourth terminal electrodes arranged on the external surface of the ceramic element body;

a third internal connection conductor arranged in the ceramic element body and connecting the third external connection conductor and the third terminal electrode; and a fourth internal connection conductor arranged in the ceramic element body and connecting the fourth external connection conductor and the fourth terminal electrode, wherein the second external connection conductor and the fourth external connection conductor are integrally formed.

6. The chip-type electronic component according to claim 5, wherein the ceramic element body is comprised of a plurality of ceramic layers laminated together, wherein a length of the third external connection conductor in a laminate direction of the plurality of ceramic layers is set to be larger than a length of the third terminal electrode in the laminate direction of the plurality of ceramic layers, and wherein a length of the fourth external connection conductor in the laminate direction of the plurality of ceramic layers is set to be larger than a length of the fourth terminal electrode in the laminate direction of the plurality of ceramic layers.

7. The chip-type electronic component according to claim 5, wherein a length of the third external connection conductor in a direction in which the third internal electrodes and the fourth internal electrodes are opposed is set to be larger than a length of the third terminal electrode in the direction in which the third internal electrodes and the fourth internal electrodes are opposed, and wherein a length of the fourth external connection conductor in the direction in which the third internal electrodes and the fourth internal electrodes are opposed is set to be larger than a length of the fourth terminal electrode in the direction in which the third internal electrodes and the fourth internal electrodes are opposed.

8. The chip-type electronic component according to claim 1, wherein the first and second principal faces are parallel to a direction in which the first internal electrodes and the second internal electrodes are opposed.

9. The chip-type electronic component according to claim 1, wherein a length of the first external connection conductor in a direction in which the first internal electrodes and the second internal electrodes are opposed is set to be larger than a length of the first terminal electrode in the direction in which the first internal electrodes and the second internal electrodes are opposed, and wherein a length of the second external connection conductor in the direction in which the first internal electrodes and the second internal electrodes are opposed is set to be larger than a length of the second terminal electrode in the direction in which the first internal electrodes and the second internal electrodes are opposed.

10. A chip-type electronic component comprising:

a ceramic element body comprised of a plurality of ceramic layers laminated together;

a plurality of first and second internal electrodes arranged in the ceramic element body so as to be opposed at least in part to each other;

a first external connection conductor which is arranged on an external surface of the ceramic element body and to which the plurality of first internal electrodes are connected;

a second external connection conductor which is arranged on the external surface of the ceramic element body and to which the plurality of second internal electrodes are connected;

first and second terminal electrodes arranged on the external surface of the ceramic element body;

a first internal connection conductor arranged in the ceramic element body and connecting the first external connection conductor and the first terminal electrode; and a second internal connection conductor arranged in the ceramic element body and connecting the second external connection conductor and the second terminal electrode, wherein the number of the first internal connection conductor is set to be smaller than the number of the first internal electrodes, and wherein the number of the second internal connection conductor is set to be smaller than the number of the second internal electrodes.

11. The chip-type electronic component according to claim 10, wherein the ceramic element body has first and second principal faces opposed to each other as the external surface, and wherein the first and second external connection conductors are arranged on the first principal face and the first and second terminal electrodes are arranged on the second principal face.

12. The chip-type electronic component according to claim 11, wherein the first and second principal faces are parallel to a laminate direction of the plurality of ceramic layers.

13. The chip-type electronic component according to claim 10, wherein a length of the first external connection conductor in a laminate direction of the plurality of ceramic layers is set to be larger than a length of the first terminal electrode in the laminate direction of the plurality of ceramic layers, and wherein a length of the second external connection conductor in the laminate direction of the plurality of ceramic layers is set to be larger than a length of the second terminal electrode in the laminate direction of the plurality of ceramic layers.

14. The chip-type electronic component according to claim 10, further comprising:
   a plurality of third and fourth internal electrodes arranged alternately in the ceramic element body so as to be opposed at least in part to each other;
   a third external connection conductor which is arranged on the external surface of the ceramic element body and to which the plurality of third internal electrodes are connected;
   a fourth external connection conductor which is arranged on the external surface of the ceramic element body and to which the plurality of fourth internal electrodes are connected;
   third and fourth terminal electrodes arranged on the external surface of the ceramic element body;
   a third internal connection conductor arranged in the ceramic element body and connecting the third external connection conductor and the third terminal electrode; and
   a fourth internal connection conductor arranged in the ceramic element body and connecting the fourth external connection conductor and the fourth terminal electrode,
   wherein the second external connection conductor and the fourth external connection conductor are integrally formed.

15. The chip-type electronic component according to claim 14,
   wherein a length of the third external connection conductor in a laminate direction of the plurality of ceramic layers is set to be larger than a length of the third terminal electrode in the laminate direction of the plurality of ceramic layers, and
   wherein a length of the fourth external connection conductor in the laminate direction of the plurality of ceramic layers is set to be larger than a length of the fourth terminal electrode in the laminate direction of the plurality of ceramic layers.

* * * * *